(12) United States Patent
Nishimura et al.

(10) Patent No.: US 11,325,324 B2
(45) Date of Patent: May 10, 2022

(54) AUTOMATED FIBER BUNDLE PLACEMENT APPARATUS

(71) Applicant: TSUDAKOMA KOGYO KABUSHIKI KAISHA, Ishikawa-ken (JP)

(72) Inventors: Isao Nishimura, Ishikawa-ken (JP); Mitsunobu Futakuchi, Ishikawa-ken (JP)

(73) Assignee: TSUDAKOMA KOGYO KABUSHIKI KAISHA, Ishikawa-Ken (JP)

( * ) Notice: Subject to any disclaimer, the term of this patent is extended or adjusted under 35 U.S.C. 154(b) by 0 days.

(21) Appl. No.: 17/162,921

(22) Filed: Jan. 29, 2021

(65) Prior Publication Data

US 2021/0268752 A1     Sep. 2, 2021

(30) Foreign Application Priority Data

Feb. 28, 2020  (JP) .............................. JP2020-032699
Sep. 25, 2020  (JP) .............................. JP2020-160315

(51) Int. Cl.
*B29C 70/38*     (2006.01)

(52) U.S. Cl.
CPC ................................. *B29C 70/384* (2013.01)

(58) Field of Classification Search
CPC ..... B92C 70/38; B92C 70/382; B92C 70/384; B92C 70/386; B92C 70/388
See application file for complete search history.

(56) References Cited

U.S. PATENT DOCUMENTS

| 5,645,677 | A | 7/1997 | Cahuzac et al. |
| 2009/0229760 | A1 | 9/2009 | Hamlyn et al. |
| 2014/0060742 | A1 | 3/2014 | Hamlyn |
| 2016/0288430 | A1* | 10/2016 | Fastert .................. B29C 70/388 |
| 2016/0325508 | A1 | 11/2016 | Hamlyn |

FOREIGN PATENT DOCUMENTS

| EP | 0198744 A1 | 10/1986 |
| EP | 0626252 A1 | 11/1994 |
| ER | 2999973 A1 | 6/2014 |
| FR | 2882681 A1 | 9/2006 |
| JP | 2014-511781 A | 5/2014 |
| JP | 2019-130914 A | 8/2019 |

OTHER PUBLICATIONS

Jul. 9, 2021, European Search Report issued for related EP application No. 21154347.5.

* cited by examiner

*Primary Examiner* — George R Koch
(74) *Attorney, Agent, or Firm* — Paratus Law Group, PLLC

(57) ABSTRACT

A guide mechanism includes a support member that supports a plurality of tow guides provided corresponding to each of fiber bundles, and a support mechanism that supports the support member with respect to an arm, and the support mechanism is configured such that the support member is displaceable in a width direction orthogonal to an extending direction of the arm in a plan.

5 Claims, 4 Drawing Sheets

AUTOMATED FIBER BUNDLE PLACEMENT APPARATUS

CROSS-REFERENCE TO RELATED APPLICATIONS

The present application claims priority from Japanese Patent Applications No. 2020-032699, filed on Feb. 28, 2020, and No. 2020-160315, filed on Sep. 25, 2020, the entire subject matter of them are incorporated herein by reference.

BACKGROUND OF THE INVENTION

Field of the Invention

According to the invention, there is provided an automated fiber bundle placement apparatus including: a supply device configured to set a plurality of bobbins around which fiber bundles are wound, and deliver the fiber bundles from each of the bobbins; a placement head for performing placement of each of the fiber bundles supplied from the supply device on a placement die; and an articulated robot which has an arm to which the placement head is attached and moves the placement head for the placement, in which the placement head is attached to the articulated robot via a rotation mechanism in which the placement head is attached to a rotation section that is rotationally driven, and the articulated robot includes a guide mechanism that guides the fiber bundle from the supply device toward the placement head.

Background Art

As an automated fiber bundle placement apparatus, an automated fiber placement (AFP) apparatus that places a narrow fiber bundle on a placement die is known. In the present application, the "fiber bundle" refers to a material such as a so-called tow prepreg formed in a tape shape by impregnating a bundle of a plurality of reinforcing fibers (carbon fibers, glass fibers, and the like) with a matrix resin. As the AFP apparatus, there is an apparatus configured to perform placement of the fiber bundle on the placement die by using an articulated robot.

As such an AFP apparatus, JP-A-2019-130914 discloses an apparatus including an unwinding mechanism configured to unwind (deliver) a fiber bundle from a bobbin around which the fiber bundle is wound, an attachment head as a placement head for performing the placement, and an articulated robot having an arm to which the attachment head (placement head) is attached. As a technology of the related art, JP-A-2019-130914 discloses an apparatus configured to guide the fiber bundle delivered from the unwinding mechanism provided separately from the articulated robot to the placement head in a form of passing above the articulated robot (arm). In addition, as a configuration for guiding the fiber bundle as described above (although there is no specific description in JP-A-2019-130914), the AFP apparatus (articulated robot) includes a guide mechanism provided in a form of being attached to the arm of the articulated robot.

As the AFP apparatus, JP-T-2014-511781 also discloses an apparatus configured to include a displacement system as an articulated robot, and a fiber attachment head which is a placement head and is attached to an end of the articulated robot, and perform the placement of a wide band (fiber bundle) made of flat fibers impregnated with resin by the fiber attachment head (placement head). JP-T-2014-511781 discloses that the AFP apparatus includes a creel (supply device) as a fiber storage unit provided separately from the articulated robot, a plurality of spools (bobbins) around which the fiber bundle is wound are set with respect to the creel, and a plurality of fiber bundles are supplied toward the placement head. In addition, the AFP apparatus of JP-T-2014-511781 is configured to include a flexible pirn that connects the supply device and the placement head to each other, and guide the fiber bundle in a form of passing through the flexible pirn.

SUMMARY OF THE INVENTION

Incidentally, in the above-described AFP apparatus, the placement is performed by moving the placement head by the articulated robot, and by making the placement head to perform the operation such as swinging or the like in a case of placing the fiber bundle on the placement die having a complicated shape. The AFP apparatus of JP-A-2019-130914 is configured such that the fiber bundle to be supplied toward the placement head is guided by the guide mechanism attached to the arm of the articulated robot on the upstream side thereof as described above, but the position for guiding the fiber bundle by the guide mechanism is a position that is relatively fixed to the arm. Therefore, in the case of performing the placement, when the placement head is made to perform a complicated operation, there is a case where the fiber bundle interferes with the arm or the like and is damaged. Therefore, the AFP apparatus that guides the fiber bundle by the guide configuration using the guide mechanism as in JP-A-2019-130914 has a problem that the operation of the placement head is restricted, that is, it is not possible to correspond to the placement die having a complicated shape.

Furthermore, in the AFP apparatus configured such that the placement head disclosed in JP-T-2014-511781 performs the placement of the plurality of fiber bundles, in a case where the guide configuration as in JP-A-2019-130914 is adopted, the plurality of fiber bundles are supplied to the placement head, and thus, the problem due to the interference described above is more likely to occur. However, in the AFP apparatus of JP-T-2014-511781, as described above, the fiber bundle is guided in a form of passing through the flexible pirn that connects the supply device and the placement head to each other. Therefore, in a case of performing the placement, even when the placement head is made to perform a complicated operation, the fiber bundle is protected by the flexible pirn, and thus, a case where the fiber bundle itself interferes with the arm or the like and is damaged does not occur.

However, in the apparatus that guides the plurality of fiber bundles by the guide configuration using the flexible pirn as in JP-T-2014-511781, the flexible pirns are provided for each fiber bundle, and thus, the guide configuration becomes complicated. In a case of the configuration, since the inside of the flexible pirn becomes dirty or clogged due to the passage of the fiber bundle as described above, it is necessary to regularly perform maintenance work in the flexible pirn. The maintenance work described above has to be performed individually for each flexible pirn provided for each fiber bundle, and thus, there is a problem that a lot of effort and time are required.

In view of the above circumstances, an object of the present invention is to provide a configuration of a guide mechanism which does not cause the above-described problem after placing a plurality of fiber bundles on a placement die in an automated fiber bundle placement apparatus including the guide mechanism that guides the plurality of fiber bundles from a supply device toward the placement head.

The present invention presupposes an automated fiber bundle placement apparatus including: a supply device configured to set a plurality of bobbins around which fiber bundles are wound, and deliver the fiber bundles from each of the bobbins; a placement head for performing placement of each of the fiber bundles supplied from the supply device on a placement die; and an articulated robot which has an arm to which the placement head is attached and moves the placement head for the placement, in which the placement head is attached to the articulated robot via a rotation mechanism in which the placement head is attached to a rotation section that is rotationally driven, and the articulated robot includes a guide mechanism that guides the fiber bundle from the supply device toward the placement head. The present invention has the following features in the automated fiber bundle placement apparatus that is the presupposition thereof.

The guide mechanism includes a plurality of tow guides provided corresponding to each of the fiber bundles, a support member that supports the tow guide, and a support mechanism configured to support the support member with respect to the arm such that the support member is displaceable in a width direction orthogonal to an extending direction of the arm in a plan.

In the automated fiber bundle placement apparatus according to the present invention, the support mechanism may include a drive mechanism that displaces the support member by a driving motor which is driven in accordance with the rotation of the placement head by the rotation mechanism. Furthermore, the support mechanism may be configured such that the support member is also displaceable in a height direction orthogonal to the width direction when viewed in the extending direction of the arm.

In the automated fiber bundle placement apparatus according to the present invention, the drive mechanism may include a rail-shaped rail member attached to the arm and provided to extend in a displacement direction of the support member, a movable member which is guided by the rail member and is displaced on the rail member, and to which the support member is attached, and a driving unit for displacing the movable member on the rail member.

According to the guide mechanism of the automated fiber bundle placement apparatus according to the present invention, the support with respect to the arm of the support member that supports the tow guide for guiding each fiber bundle on one end side is performed via the support mechanism that makes the support member displaceable in the width direction. According to the configuration, in the automated fiber bundle placement apparatus that places the plurality of fiber bundles on the placement die, without restricting the operation of the placement head, and without using the flexible pirn similar to the apparatus of JP-T-2014-511781, it is possible to prevent each fiber bundle from interfering with the arm or the like.

More specifically, in the automated fiber bundle placement apparatus according to the present invention, the support member is supported by the arm of the articulated robot via the support mechanism as described above, and accordingly, each tow guide is configured to be displaceably supported with respect to the arm. Accordingly, the guide mechanism can be configured such that each tow guide is displaced in accordance with the operation such as swinging of the placement head. By configuring each tow guide to be displaced in this manner, even when the placement head is made to perform a complicated operation in the placement, it is possible to prevent the fiber bundle from interfering with the arm or the like of the articulated robot. Therefore, according to the configuration, it is not necessary to restrict the operation of the placement head in consideration of the fact that each fiber bundle interferes with the arm or the like of the articulated robot, and it is possible to perform the placement even in the placement die having a complicated shape. Moreover, since each fiber bundle is configured not to interfere with the arm or the like in this manner, it is not necessary to use the flexible pirn as described above for the purpose of preventing the interference, and it is possible to avoid complicating the guide configuration, and eventually the configuration of the automated fiber bundle placement apparatus.

In the automated fiber bundle placement apparatus according to the present invention, by configuring the support mechanism to include the drive mechanism in which the driving motor driven in accordance with the rotation of the placement head serves as a driving source so that the displacement of the tow guide (support member) is actively performed in accordance with the rotation of the placement head, the displacement of the tow guide is performed more reliably in accordance with the rotation of the placement head. Accordingly, it is possible to more reliably prevent the fiber bundle as described above from interfering with the arm or the like of the articulated robot.

Furthermore, the support mechanism can be made compact by configuring the support mechanism such that the support member can be displaced not only in the width direction but also in the height direction. More specifically, in the present invention, the support mechanism is configured such that the support member (tow guide) can be displaced in the width direction. Regarding the displacement, the support member may be displaced linearly in the width direction without changing the position in the height direction, but as described above, the displacement can also be performed to change the position in the height direction, that is, the displacement can also be performed such that the support member makes an arcuate motion. By configuring the support mechanism in which the displacement of the support member is performed as in the latter case, the support mechanism can be made smaller (more compact) than the configuration of the support mechanism in which the displacement of the support member is performed as in the former case.

In a case where the displacement of the tow guide is performed by using the drive mechanism as described above, by configuring the drive mechanism to displace the movable member to which the support member is attached on the rail member attached to the arm, it is possible to more accurately perform the displacement of each tow guide in accordance with the rotation of the placement head.

Specifically, for example, in a case where the displacement of the support member is performed to make an arcuate motion as described above, as the configuration for this, a configuration in which the support member that supports the plurality of tow guides on one end side is made oscillate around the other end portion can be considered. In this case, the drive mechanism is configured to connect the driving motor and an output shaft thereof with the support member, and the other end portion (oscillation center) of the support member is configured to be rotated directly by the driving motor or indirectly via a drive transmission member or the like. However, in this case, the force (rotational force) that acts on the other end portion due to the inertial force in accordance with the displacement of the support member acts on the drive mechanism as a force opposite to the driving direction by the drive mechanism.

On the other hand, by configuring the drive mechanism to displace the movable member (the other end portion of the support member) on the rail member as described above, the driving direction by the drive mechanism and the direction in which the rotational force acts are different directions. Accordingly, since the entire rotational force does not act on the drive mechanism at the time when the displacement of the movable member (support member) is started and at the time when the displacement is stopped, the displacement of each tow guide in accordance with the rotation of the placement head is performed more accurately.

DETAILED DESCRIPTION OF THE INVENTION

Hereinafter, an embodiment of an automated fiber bundle placement apparatus according to the invention will be described with reference to FIGS. 1 to 4.

Figure 1:
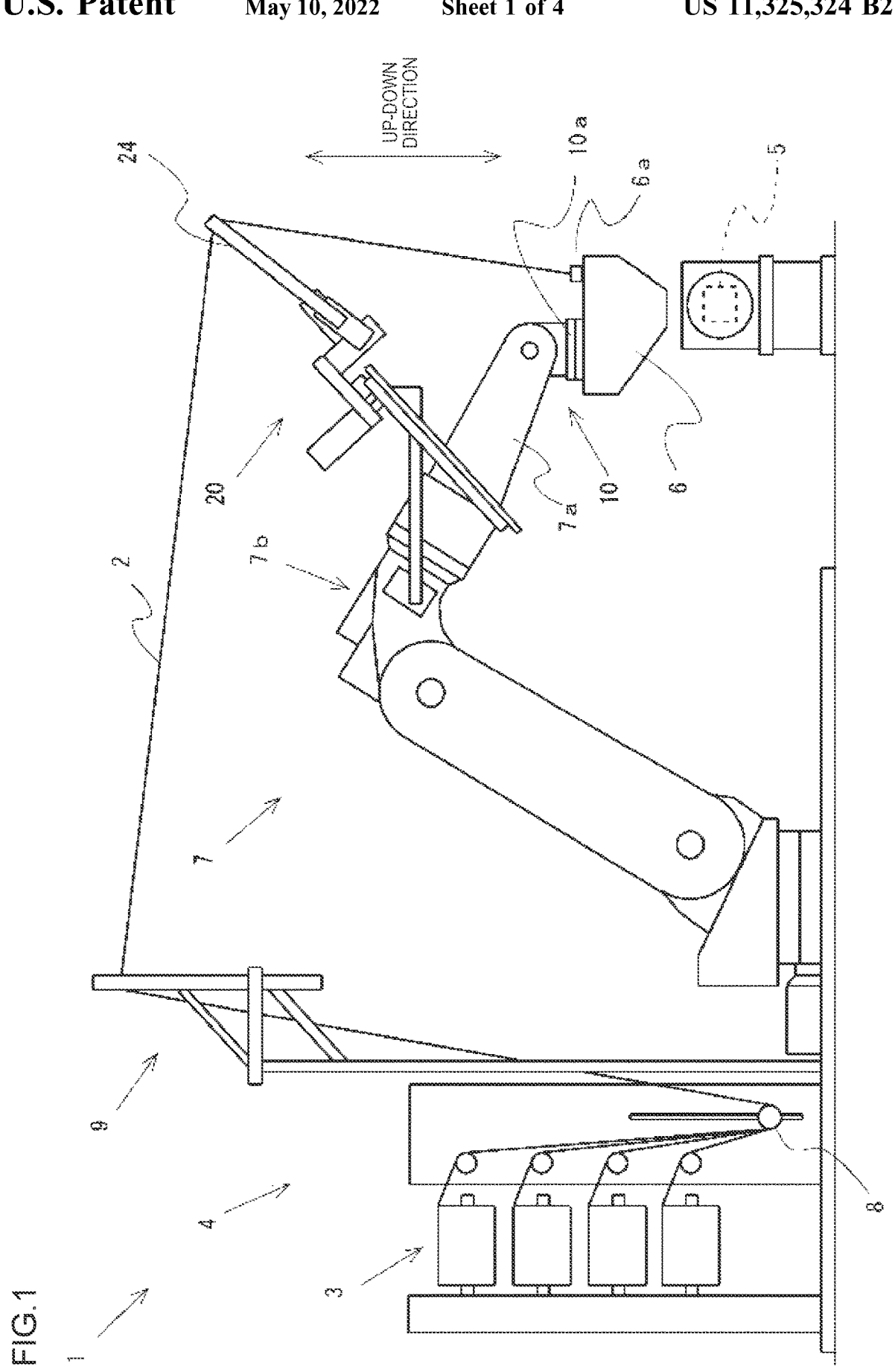
FIG. 1 is a side elevation illustrating an example of an automated fiber bundle placement apparatus according to the invention.

As illustrated in FIG. 1, an automated fiber bundle placement apparatus 1 includes: a supply device 4 configured to set bobbins 3 around which fiber bundles 2 are wound, a placement head 6 for performing placement of the fiber bundles 2 supplied from the supply device 4 on a placement die 5; and an articulated robot 7 which moves the placement head 6 for the placement. In the embodiment, the automated fiber bundle placement apparatus 1 is configured such that the placement of sixteen fiber bundles 2 is performed at the same time. Therefore, although only four on the front side are illustrated in the drawing, but sixteen bobbins 3 are set in the supply device 4.

The supply device 4 includes a guide section 9 that guides the fiber bundle 2 pulled out from each bobbin 3 toward the articulated robot 7. The guide section 9 is configured to include a guide member (not illustrated) provided for each fiber bundle 2 for guiding each fiber bundle 2 individually, and to guide each fiber bundle 2 to a position higher than the articulated robot 7 by the guide member. In the supply device 4, a dancer roll 8 common to each fiber bundle 2 is provided as a configuration for adjusting the tension of each fiber bundle 2 in the path of the fiber bundle 2 between each bobbin 3 and the guide section 9. According to the configuration, each fiber bundle 2 is adjusted to an appropriate tension between the bobbin 3 and the guide section 9, and is pulled out to the articulated robot 7 side in an appropriate tension state.

As illustrated in FIG. 1, as described above, a guide mechanism 20 for guiding each fiber bundle 2 guided by the guide section 9 is attached to the articulated robot 7. The guide mechanism 20 is attached to an arm 7a (a part on the extremity side of a joint portion 7b) on the extremity side of the articulated robot 7. The guide mechanism 20 includes tow guides provided for each fiber bundle 2 for guiding each fiber bundle 2 individually, and is configured such that each tow guide is supported by the support member 24. The guide mechanism 20 is provided such that the support member 24 extends upward above the arm 7a and guides each fiber bundle 2 on the extremity side of the support member 24.

Therefore, in the automated fiber bundle placement apparatus 1, after the fiber bundle 2 pulled out from each bobbin 3 is pulled out from the supply device 4 (guide section 9) at a position higher than that of the articulated robot 7 in the up-down direction, the fiber bundle 2 reaches the guide mechanism 20 in a form of passing above the articulated robot 7. Each fiber bundle 2 is turned in a form of being guided by the guide mechanism 20, and is guided to the placement head 6 attached to the extremity of the arm 7a in the articulated robot 7.

The placement head 6 is attached to the arm 7a of the articulated robot 7 via a rotation mechanism 10. The rotation mechanism 10 has a rotation section 10a that is rotationally driven, and the placement head 6 is attached to the rotation section 10a. Accordingly, the placement head 6 is provided to be swingably driven by the rotation mechanism 10 on the extremity side of the articulated robot 7.

Each of the fiber bundles 2 guided from the guide mechanism 20 toward the placement head 6 is introduced into the placement head 6 and placed on the placement die 5. Therefore, the placement head 6 has an introduction section 6a for introducing each fiber bundle 2 into the inside thereof in a form of being provided for each fiber bundle 2. The introduction section 6a is provided at a position eccentric with respect to the axial center of the rotation mechanism 10, which is the swing center of the placement head 6. Due to this configuration, as the placement head 6 is swingably driven, the introduction section 6a is displaced such that the position thereof is changed with respect to the extremity of the arm 7a.

In the automated fiber bundle placement apparatus 1 configured as described above, in the invention, the guide mechanism 20 includes the support member 24 that supports the tow guide and the support mechanism that supports the support member 24, and is configured such that the support mechanism can displace the support member 24 in the width direction. However, the "width direction" referred to in the invention is a direction orthogonal to the extending direction of the arm 7a in a plan. In addition, the embodiment is an example in which the support mechanism includes a drive mechanism which is for actively displacing the support member 24 and uses a driving motor as a driving source, and is configured such that the support member 24 is also displaced by the drive mechanism in the height direction (the direction orthogonal to the width direction when viewed in the extending direction of the arm 7a) in addition to the width direction, that is, the support member 24 is displaced along the arc direction. The configuration of the guide mechanism 20 will be described in detail below with reference to FIGS. 2 to 4.

As described above, the automated fiber bundle placement apparatus 1 of the embodiment is configured to be capable of placing sixteen fiber bundles 2. Here, the automated fiber bundle placement apparatus 1 includes sixteen tow guides 22 that correspond to each fiber bundle 2. In the embodiment, each tow guide 22 is configured with a hollow cylindrical member having a collar portion. In addition, the sixteen tow guides 22 are supported by the support member 24.

The support member 24 is mainly configured with a pair of side plates 24a and 24a. Regarding the support member 24, more specifically, each side plate 24a is a plate-shaped member and is formed to have a rectangular shape in which the dimension in the long side direction is sufficiently larger than the dimension in the short side direction when viewed in the plate thickness direction. In the support member 24, the pair of side plates 24a and 24a are provided such that the plate surfaces are separated from each other in a form of facing each other.

Furthermore, the support member 24 has spindles 24b provided in a form of being erected on both side plates 24a and 24a. In other words, the pair of side plates 24a and 24a are connected to each other by the spindles 24b. The spindles 24b are shafts for supporting the tow guides 22, and four spindles 24b are provided on one end side of the side plate 24a in the long side direction (=longitudinal direction of the side plate 24a). The sixteen tow guides 22 are provided in a form that the tow guides 22 are supported by each spindle 24b four by four. The support of the tow guide 22 is performed by the spindle 24b in a form that the spindle 24b is inserted into the hole of the hollow cylindrical tow guide 22, and each tow guide 22 can rotate with respect to the spindle 24b.

Incidentally, in the illustrated example, the support member 24 also includes a reinforcing member 24c that connects both the side plates 24a and 24a to each other. The reinforcing member 24c connects both the side plates 24a and 24a to each other in a form of being erected in the vicinity of the intermediate portion in the longitudinal direction of the side plate 24a.

In addition, the support member 24 is supported by a support mechanism 26 attached to the arm 7a of the articulated robot 7. However, the guide mechanism 20 (support mechanism 26) of the embodiment has a longitudinal oscillation mechanism 50 (details will be described later) that oscillates the support member 24 in the extending direction of the arm 7a. The support member 24 is supported by the support mechanism 26 via the longitudinal oscillation mechanism 50. Here, the support member 24 is attached to the longitudinal oscillation mechanism 50 in a form that the longitudinal oscillation mechanism 50 is positioned between both the side plates 24a and 24a on the other end side of the side plate 24a in the longitudinal direction.

Regarding the support mechanism 26 that supports the support member 24 in this manner, in the embodiment, the support mechanism 26 supports the support member 24, and includes a drive mechanism 30 that actively displaces the support member 24 using the driving motor 31 as a driving source, and a guide support structure 40 that supports the drive mechanism 30 with respect to the arm 7a. The drive mechanism 30 includes a rail member 32 supported with respect to the arm 7a via the guide support structure 40, a movable member 33 which is displaced on the rail member 32 and to which the support member 24 is attached, and a driving unit 34 for displacing the movable member 33 on the rail member 32.

More specifically, with respect to each component of the drive mechanism 30, the rail member 32 is mainly configured with a plate-shaped base portion 32a as a base. However, the base portion 32a is formed in an arc shape of approximately ⅔ of a circle when viewed in the plate thickness direction. The inner diameter of the base portion 32a is formed to have a size that the arm 7a of the articulated robot 7 can be placed inside the base portion 32a.

The rail member 32 has a guide rail 32b for guiding the displacement of the movable member 33, and a rack 32c that functions as a part of the driving unit 34. Among them, the guide rail 32b is a rail-shaped part having a substantially rectangular cross-sectional shape and provided to extend on the front surface which is one end surface in the plate thickness direction in the base portion 32a. However, the guide rail 32b is formed in an arc shape to extend along the peripheral edge of the base portion 32a. The guide rail 32b is positioned on the outer peripheral edge side of the base portion 32a on the front surface, and is provided to extend over a range in the arc direction of the base portion 32a.

The rack 32c is a so-called rack in which teeth engaged with the pinion are formed, and is provided to extend on the front surface of the base portion 32a similar to the guide rail 32b. Similar to the guide rail 32b, the rack 32c is also formed in an arc shape to extend along the peripheral edge of the base portion 32a. However, the rack 32c is formed such that the teeth face the inside of the arc. The rack 32c is positioned to be separated from the guide rail 32b on the inner peripheral edge side of the base portion 32a on the front surface, and is provided to extend over a range in the arc direction of the base portion 32a.

The movable member 33 is configured with a support 33a which is the main body of the movable member 33 and supports the support member 24, and an engaging member 33b engaged with the guide rail 32b of the rail member 32 that is supposed to guide the displacement of the support 33a on the rail member 32. The driving unit 34 for displacing the support 33a (movable member 33) in this manner uses the driving motor 31 as a driving source as described above, and the driving motor 31 is supported by the support 33a. The details of these configurations are as follows.

The support 33a is a plate-shaped member, and is a member having a rectangular shape when viewed in the plate thickness direction (both plate surfaces in the plate thickness direction form a rectangular shape). However, the support 33a is formed such that the dimension in the long side direction of both the plate surfaces thereof is a dimension (a dimension approximately twice the distance) sufficiently larger than the distance between the guide rail 32b and the rack 32c in the rail member 32.

The engaging member 33b is a block-shaped member formed in a thick plate shape. The engaging member 33b is attached to the support 33a in an orientation in which the thickness direction matches the plate thickness direction of the support 33a, and one of both end surfaces in the thickness direction is an attachment surface.

The engaging member 33b has a guide groove 33b1 formed to be open to the other end surface of the both end surfaces and also to be open to the surfaces on both sides in the long side direction of the other end surface. However, the guide groove 33b1 is formed to make an arc with the same curvature as that of the guide rail 32b in the rail member 32. The guide groove 33b1 is formed to have a size such that the guide rail 32b can be engaged with the guide groove 33b1. In other words, the guide groove 33b1 is formed to have a size such that the groove width substantially matches (slightly large) the width of the guide rail 32b. The depth dimension of the guide groove 33b1 is smaller than the height dimension of the guide rail 32b, and is approximately half in the illustrated example.

In addition, the engaging member 33b is attached to one of both the plate surfaces of the support 33a by a screw member or the like in a state of abutting against the attachment surface. However, regarding the attachment, the attachment is performed in a state where the engaging member 33b is positioned in the vicinity of the intermediate portion in the long side direction (=the long side direction of the support 33a) of the plate surface of the support 33a, and the long side direction of the attachment surface of the engaging member 33*b* matches the short side direction of the plate surface of the support 33*a*.

The driving unit 34 is configured with the driving motor 31 which is a driving source, a pinion 31*a* attached to an output shaft of the driving motor 31, and the rack 32*c* engaged with the pinion 31*a*. In other words, the rack 32*c* provided on the rail member 32 also functions as a part of the driving unit 34.

In the driving unit 34, the driving motor 31 is provided in a form of being supported by the support 33*a* as described above, and is attached to the other one of both the plate surfaces of the support 33*a* by a screw member or the like. The attachment is performed in a form of making the axial direction of the output shaft of the driving motor 31 match the plate thickness direction of the support 33*a*. Here, the support 33*a* is formed with a through hole that allows the output shaft to pass through the part corresponding to the output shaft at the position where the driving motor 31 is attached. However, the attachment position is set to a position on the inner peripheral side of the arc-shaped guide groove 33*b*1 in the engaging member 33*b* with respect to the long side direction of the support 33*a* in the positional relationship with the engaging member 33*b* which is also attached to the support 33*a*, that is, a position where the distance between the output shaft of the driving motor 31 and the guide groove 33*b*1 of the engaging member 33*b* is substantially the same as the distance between the guide rail 32*b* and the rack 32*c* in the rail member 32.

In addition, in a state where the driving motor 31 is attached to the support 33*a* as described above, the output shaft of the driving motor 31 penetrates the support 33*a*, and is in a state where the extremity portion thereof is positioned on the one plate surface of the support 33*a*. In addition, the pinion 31*a* is attached to the extremity portion of the output shaft. As described above, the pinion 31*a* is engaged with the rack 32*c* of the rail member 32. Therefore, the attachment position of the driving motor 31 with respect to the support 33*a* is a position where the pinion 31*a* attached to the driving motor 31 is engaged with the rack 32*c* in a state where the engaging member 33*b* attached to the support 33*a* is engaged with the guide rail 32*b* of the rail member 32.

The drive mechanism 30 provided with each component is configured such that the movable member 33 and the rail member 32 are combined with each other in a form of engaging the engaging member 33*b* in the movable member 33 with the guide rail 32*b* in the rail member 32 in the guide groove 33*b*1. In a state where the engaging member 33*b* and the guide rail 32*b* are engaged with each other in this manner, since the driving motor 31 in the driving unit 34 is attached to the support 33*a* at the above-described position, and the driving motor 31 is in a state of being positioned on the rack 32*c* side of the guide rail 32*b* with respect to the rail member 32. In this state, the drive mechanism 30 is in a state where the pinion 31*a* attached to the driving motor 31 and the rack 32*c* of the rail member 32 is engaged with each other.

In addition, the drive mechanism 30 is supported by the arm 7*a* of the articulated robot 7 via the guide support structure 40 as described above. The guide support structure 40 is configured to support the drive mechanism 30 by a pair of support bars 40*a* and 40*a*. Each of the support bars 40*a* is a prismatic member in the embodiment.

The guide support structure 40 includes a pair of attachment sections 40*b* and 40*b* which are attachment sections 40*b* for attaching each support bar 40*a* to the arm 7*a*, and are attached to the arm 7*a*. Each attachment section 40*b* is attached to the back end portion of the arm 7*a* on the side opposite to the extremity portion to which the placement head 6 is attached. The pair of attachment sections 40*b* and 40*b* are provided in a form of extending from both side portions of the arm 7*a* toward both sides of the arm 7*a*. Each of the support bars 40*a* is attached (supported) to the attachment section 40*b* at one end portion thereof in a form of extending from the back end portion of the arm 7*a* to which the attachment section 40*b* is attached toward the extremity side of the arm 7*a*. In a state where each support bar 40*a* is attached in this manner, the other end portion is positioned above the arm 7*a*, and is provided in a form that the extending direction of the arm 7*a* makes an angle approximately 30° with respect to the extending direction of the arm 7*a* when viewed from the side.

In the illustrated example, the guide support structure 40 includes a reinforcing member 40*d* that connects both support bars 40*a* and 40*a* to each other. The reinforcing member 40*d* connects both the support bars 40*a* and 40*a* to each other in a form of being erected in the vicinity of the other end portion of the support bar 40*a*.

Furthermore, the guide support structure 40 includes a pair of support sections 40*c* and 40*c* that are support sections 40*c* provided at the other end portion of each support bar 40*a* and are in a state where the drive mechanism 30 (rail member 32) is attached to each support bar 40*a* and the drive mechanism 30 is supported by both the support bars 40*a* and 40*a*.

Each of the support sections 40*c* is configured in a form that two plate-shaped portions 40*c*1 and 40*c*1 made of a plate material face each other. Each of the plate-shaped portions 40*c*1 is formed in a substantially L shape having a rectangular part attached to the support bar 40*a* and a triangular part formed to extend from one side edge of the rectangular part in the short side direction. The triangular part is formed such that the inclined side edge is formed to make an obtuse angle with respect to the one side edge of the rectangular part, and the angle is approximately 140° in the illustrated example. Furthermore, although not illustrated, each of the plate-shaped portions 40*c*1 has a plate surface that extends in the plate thickness direction from the inclined side edge at the triangular part.

In addition, the two plate-shaped portions 40*c*1 and 40*c*1 that configure the support section 40*c* are attached to the side surface of the corresponding support bar 40*a* while the plate surfaces are oriented facing the support bar 40*a* on the end surface of the rectangular part. Therefore, in a state where each plate-shaped portion 40*c*1 is attached in this manner, the two plate surfaces face the support bar 40*a* and are in a form of existing while making an angle of approximately 140° with respect to the extending direction of the support bar 40*a*. The two plate surfaces serve as surfaces (attachment surfaces) to which the drive mechanism 30 (rail member 32) is attached in the support section 40*c*.

The drive mechanism 30 is attached to the guide support structure 40 in a state where the back surface (the end surface on the side opposite to the side on which the guide rail 32*b* or the like is provided) of the base portion 32*a* in the rail member 32 abuts against the attachment surface in each of the support sections 40*c*. The attachment is performed in a state where the guide support structure 40 is oriented such that both the support bars 40*a* and 40*a* (arms 7*a*) are positioned inside the base portion 32*a*, and the center of the base portion 32*a* matches the center of the arm 7*a* in a plan. In a state where the attachment is performed in this manner, the drive mechanism 30 is in a state where the base portion 32*a* makes the angle of approximately 70° with respect to the extending direction of the arm 7a and extends above from the position of the arm 7a when the arm 7a is viewed from side.

The drive mechanism 30 (support mechanism 26) includes the longitudinal oscillation mechanism 50 that oscillates the support member 24 in the extending direction of the arm 7a as described above, and the support member 24 is supported by the drive mechanism 30 in the longitudinal oscillation mechanism 50. The longitudinal oscillation mechanism 50 includes an oscillation drive mechanism 51 for oscillating the support member 24 using a driving motor 51a as a driving source, and a pair of oscillating arms 52 and 52 that connect the oscillation drive mechanism 51 and the support member 24 to each other.

Regarding the longitudinal oscillation mechanism 50, more specifically, the oscillation drive mechanism 51 is based on a substantially rectangular parallelepiped support housing 51b, and is attached to the support 33a in the movable member 33 in the support housing 51b. The attachment of the support housing 51b to the support 33a is performed in a form of being attached to the one plate surface (plate surface on a side to which the engaging member 33b is attached) in the support 33a on the side opposite to the driving motor 31 side with respect to the engaging member 33b in the long side direction of the support 33a. The support housing 51b is attached to the support 33a while the end surface thereof abuts against the support 33a and two of the four side surfaces orthogonal to the end surface that abuts against the support 33a are parallel to the long side direction of the support 33a.

In addition, the driving motor 51a is attached to the side surface orthogonal to the long side direction of the support 33a, that is, the side surface on the side far from the engaging member 33b, among the side surfaces in the support housing 51b, with a screw member or the like. In other words, in the support housing 51b, the side surface thereof is a motor attachment surface. The driving motor 51a is attached to the support housing 51b in a state where the output shaft matches the long side direction of the support 33a and the output shaft penetrates the side wall including the motor attachment surface of the support housing 51b.

The oscillation drive mechanism 51 includes an oscillation shaft 51c provided on the support housing 51b while being parallel to the motor attachment surface of the support housing 51b. With respect to two side surfaces (lateral side surfaces) in the support housing 51b parallel to the long side direction of the support 33a, the oscillation shaft 51c is provided in a form of penetrating the side walls including each of the lateral side surfaces of the support housing 51b and being supported by both side walls. In other words, the oscillation shaft 51c is supported by the support housing 51b, and both end portions thereof are provided in the oscillation drive mechanism 51 in a form of protruding from the lateral side surface of the support housing 51b.

In addition, in the oscillation drive mechanism 51, the output shaft of the driving motor 51a and the oscillation shaft 51c are connected to each other on the inside of the support housing 51b by using a gear mechanism (not illustrated). Since the output shaft of the driving motor 51a and the oscillation shaft 51c are orthogonal to each other in the axial direction, the gear mechanism thereof uses a bevel gear or the like. With such a configuration, in the oscillation drive mechanism 51, the oscillation shaft 51c is driven to oscillate as the driving motor 51a is driven in forward and reverse directions.

Each of the oscillating arms 52 is a thick plate-shaped member, and is a member formed in a rectangular shape when viewed in the plate thickness direction. Each of the oscillating arms 52 has a split collar mechanism formed at one end portion in the longitudinal direction thereof. The pair of oscillating arms 52 and 52 are attached to both end portions of the oscillation shaft 51c in the oscillation drive mechanism 51 by each of split collar mechanisms not to be relatively rotatable by split collar fixing. The attachment of each oscillating arm 52 to the oscillation shaft 51c is performed in a form that the phases of both the oscillating arms 52 and 52 with respect to the oscillation shaft 51c match each other, and each of the oscillating arms 52 extends from the position of the oscillation shaft 51c toward the driving motor 51a side.

The support member 24 is supported by the longitudinal oscillation mechanism 50 in the drive mechanism 30 in a form of being attached to the pair of oscillating arms 52 and 52. The attachment of the support member 24 to the oscillating arm 52 is performed in a form that the pair of side plates 24a and 24a of the support member 24 are attached at the part of each of the other end portions in the longitudinal direction of the side plate 24a in a state where the longitudinal direction of the side plates 24a matches the extending direction of the oscillating arm 52. Therefore, the support member 24 is in a state of being supported by the longitudinal oscillation mechanism 50 in a form that the side plate 24a extends from the longitudinal oscillation mechanism 50 (oscillation shaft 51c) in the extending direction.

In addition, the longitudinal oscillation mechanism 50 is included in the drive mechanism 30 of the support mechanism 26 as described above, and is supported at the support 33a of the movable member 33 with respect to the movable member 33 provided on the rail member 32 in the drive mechanism 30. Since the drive mechanism 30 is supported by the arm 7a of the articulated robot 7 by the guide support structure 40, the support member 24 is in a state of being supported by the arm 7a by the support mechanism 26 including the guide support structure 40 and the drive mechanism 30.

Figure 2:
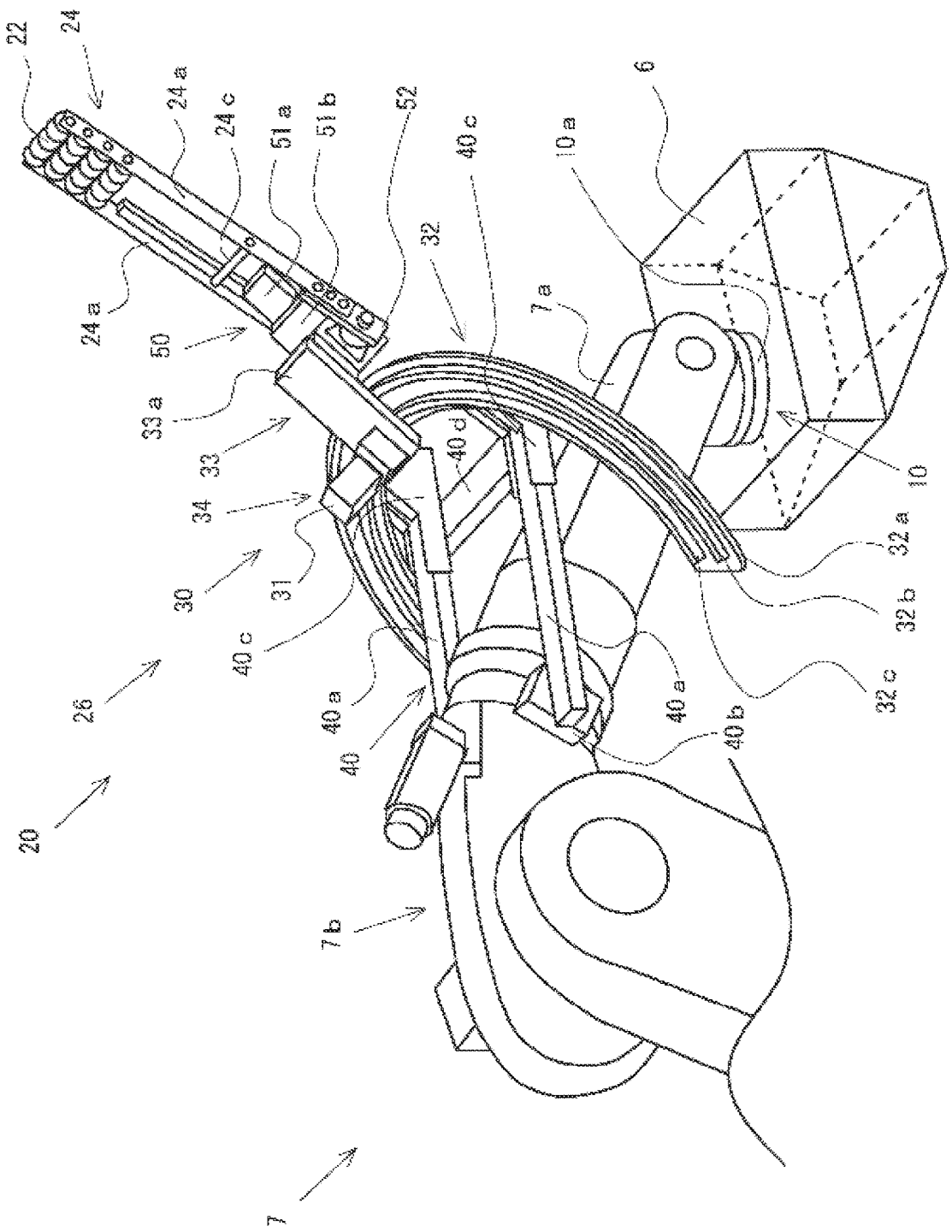
FIG. 2 is a perspective view illustrating the surrounding of a guide mechanism of the automated fiber bundle placement apparatus according to the invention.
Figure 3:
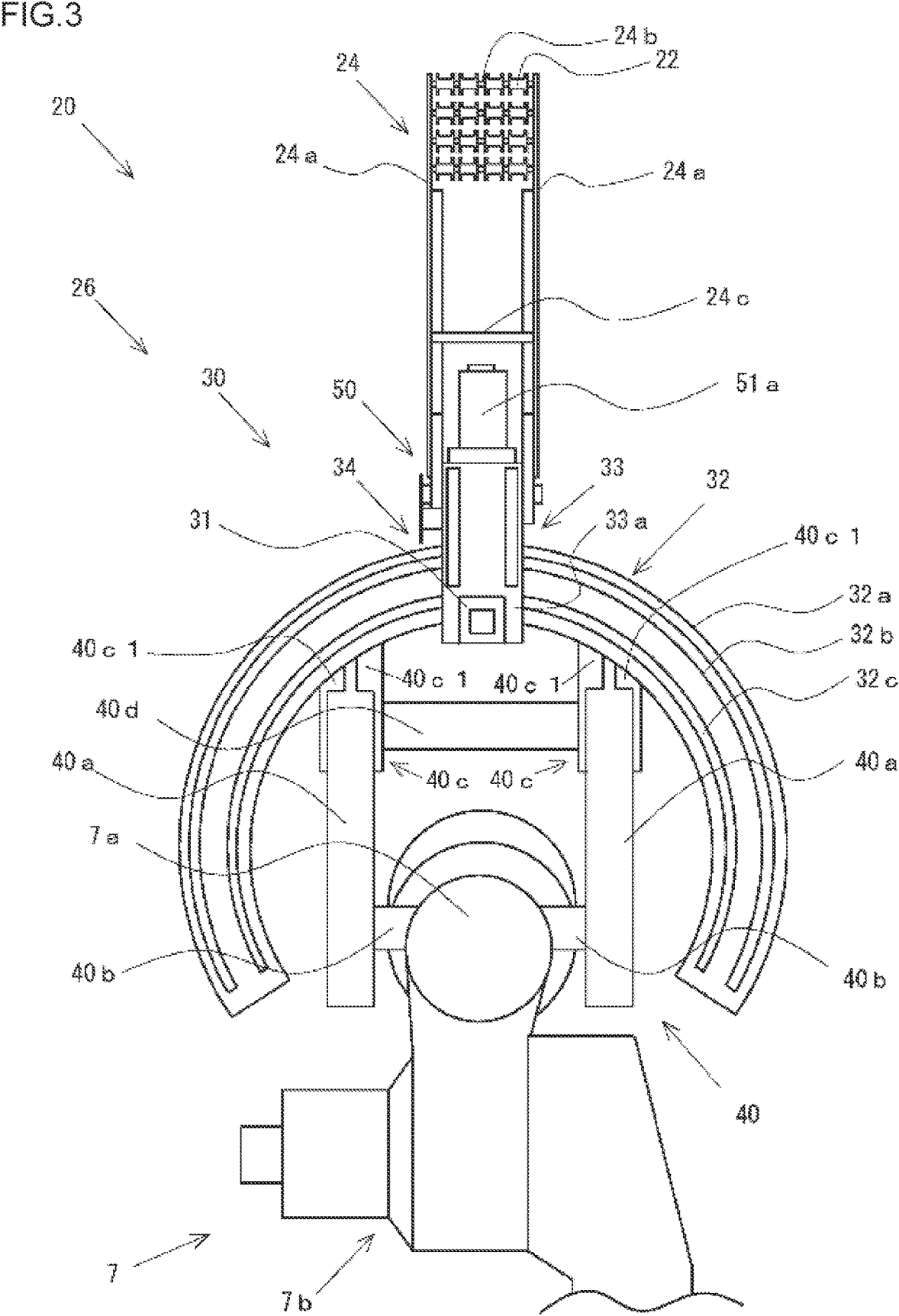
FIG. 3 is a plan of the guide mechanism illustrated in FIG. 1.
Figure 4:
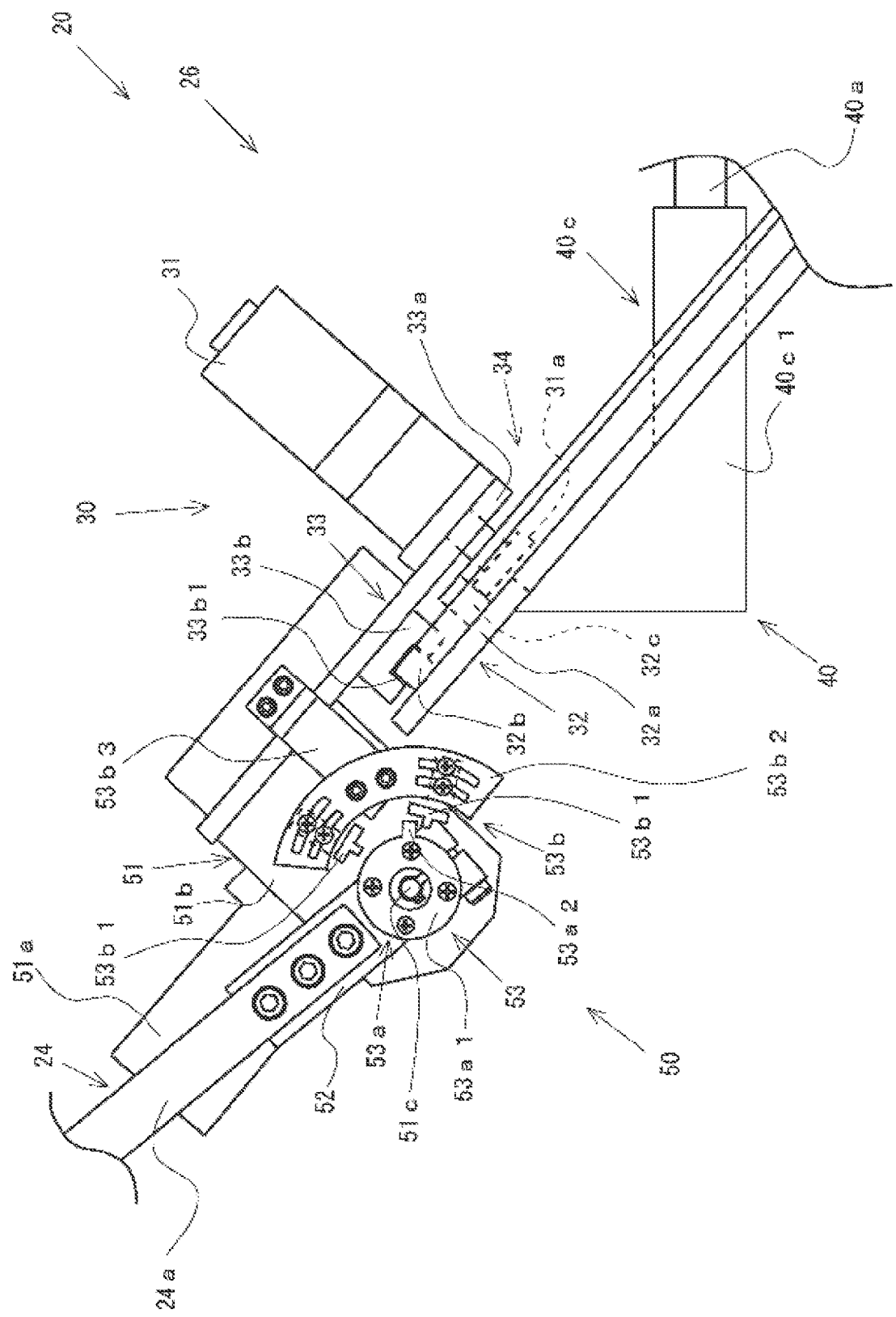
FIG. 4 is a side elevation of the guide mechanism illustrated in FIG. 1.

In a state of being supported by the arm 7a in this manner, the support member 24 makes an angle of approximately 70° toward the extremity side of the arm 7a with respect to the extending direction of the arm 7a when the arm 7a is viewed from the side, and is in a state of extending toward the extremity side of the arm 7a in a direction substantially along the front surface of the rail member 32 with respect to the rail member 32 supported by the arm 7a. The tow guides 22 provided in accordance with the number (sixteen in the embodiment) of fiber bundles 2 to directly guide the fiber bundles 2 are supported on the extremity side of the pair of side plates 24a and 24a of the support member 24 supported by the arm 7a in the above manner. Incidentally, in the embodiment, the position of the tow guide 22 supported in this manner is above the extremity of the arm 7a in a state where the movable member 33 is positioned at the center of the rail member 32 (base portion 32a) in the width direction as illustrated in FIGS. 1 and 2.

According to the automated fiber bundle placement apparatus 1 provided with the guide mechanism 20 (support mechanism 26) configured as described above, by operating the articulated robot 7 (arm 7a) according to a preset program, the placement of the plurality of fiber bundles 2 on the placement die 5 is performed. In the above-described placement, the rotation mechanism 10 (rotation section 10a) in which the placement head 6 is attached to the arm 7a is swingably driven in accordance with the shape on the placement die 5 on which the placement of the fiber bundle 2 is performed, and accordingly, there is also a case where the swing drive of the placement head 6 for making the placement head 6 swing around the axial line of the rotation section 10a is performed.

In addition, as the placement head 6 is swingably driven in this manner, the driving motor 31 in the driving unit 34 is driven to displace the movable member 33 on the rail member 32 in the drive mechanism 30 in the support mechanism 26. When the driving motor 31 is driven, the pinion 31a attached to the output shaft is engaged with the rack 32c on the rail member 32, and accordingly, the support 33a and the engaging member 33b attached to the support 33a in the movable member 33 to which the driving motor 31 is attached are displaced in the arc direction of the rail member 32 along the guide rail 32b in a form of being guided to the guide rail 32b on the rail member 32 by the engaging member 33b. The drive (drive timing and the like) of the driving motor 31 is also preset in the program in accordance with the swing drive of the placement head 6. Therefore, the displacement drive of the movable member 33 is executed in accordance with the swing drive of the placement head 6.

When the movable member 33 is driven to be displaced in this manner, the support member 24 attached to the movable member 33 is displaced along the rail member 32 in accordance with the swing operation of the placement head 6. Since the rail member 32 is provided with respect to the arm 7a as described above, the displacement is performed such that the position of the support member 24 changes in the width direction. Accordingly, since it is possible to avoid interference of the fiber bundle 2 with the arm 7a or the like of the articulated robot 7 due to the swing operation of the placement head 6, the restriction on the operation of the placement head 6 can be reduced as much as possible.

Moreover, the rail member 32, which is a base for displacing the support member 24 in the width direction in this manner, is formed in an arc shape and is provided in a form of being positioned around the arm 7a as described above. Accordingly, the drive mechanism 30 (support mechanism 26) that displaces the support member 24 in the width direction as described above is configured to be compact as a whole. In the drive mechanism 30, as a result of forming the rail member 32 in an arc shape as described above, the support member 24 is displaced not only in the width direction but also in the height direction.

In the drive mechanism 30, the rail member 32 is configured to be supported by the arm 7a such that the angle of the rail member 32 with respect to the extending direction of the arm 7a when the arm 7a is viewed from the side is approximately 70°. In other words, the rail member 32 is provided to be in a state of being tilted toward the extremity side of the arm 7a. By configuring the rail member 32 to be provided in a tilted state in this manner, the drive mechanism 30 performs the displacement of the support member 24 not only in the above-described width direction and the height direction but also in the extending direction of the arm 7a. Accordingly, it is possible to prevent the path length of each fiber bundle 2 from suddenly changing due to the swing operation of the placement head 6 between the tow guide 22 and the placement head 6.

More specifically, in a case where the drive mechanism is configured such that the rail member is formed in an arc shape as described above, the drive mechanism may be configured such that the angle of the rail member is 90°. However, in this case, the displacement of the support member is performed only in the width direction and the height direction. However, in a case where the position of the part (introduction section) for introducing each fiber bundle 2 in the placement head 6 is eccentric from the swing center of the placement head 6 as described above, as the placement head 6 swings, the introduction section is displaced not only in the width direction but also in the extending direction of the arm 7a. Therefore, in a case where the drive mechanism is configured such that the angle of the rail member is 90°, the displacement of the support member is not performed in the extending direction of the arm, and thus, the change in path length of each fiber bundle from each tow guide to the placement head becomes large.

On the other hand, when the drive mechanism is configured such that the arc-shaped rail member is provided in a state of being tilted toward the extremity side of the arm 7a as described above, the displacement of the support member 24 is also performed in the extending direction of the arm 7a, and thus, compared to a case where the angle of the rail member is 90°, the change in path length of each fiber bundle 2 is reduced. In a case where the path length changes significantly, there is a case where a problem that this case adversely affects the placement occurs, but the occurrence of such a problem can be prevented as much as possible.

Furthermore, the drive mechanism 30 in the guide mechanism 20 (support mechanism 26) of the embodiment includes the longitudinal oscillation mechanism 50 configured as described above, and the support member 24 is supported by the rail member 32 (movable member 33) via the longitudinal oscillation mechanism 50. The pair of oscillating arms 52 and 52 to which the support member 24 is attached in the longitudinal oscillation mechanism 50 are driven to oscillate by the driving motor 51a in the extending direction of the arm 7a. Therefore, as the pair of oscillating arms 52 and 52 are driven to oscillate, the support member 24 are driven to oscillate in the extending direction of the arm 7a around the position of the oscillation shaft 51c in the longitudinal oscillation mechanism 50. Accordingly, the support mechanism 26 can displace the tow guide 22 supported by the support member 24 in the extending direction of the arm 7a in accordance with the operation of the placement head 6.

As described above, the drive mechanism 30 is configured such that the drive for displacing the support member 24 in the width direction and the drive for oscillating the support member 24 in the extending direction of the arm 7a are actively performed by using the driving motors 31 and 51a as driving sources. Accordingly, the displacement of each tow guide 22 in accordance with the operation of the placement head 6 is performed more reliably.

Incidentally, the longitudinal oscillation mechanism 50 of the embodiment includes an oscillation detection device 53 that detects that the oscillation of the support member 24 exceeds the allowable range. The oscillation detection device 53 is configured with a detected body 53a attached to the oscillating arm 52, and a detection mechanism 53b that detects the detected body 53a.

Regarding the oscillation detection device 53, more specifically, the detected body 53a is a member formed of a thin plate material and mainly in a shape of a disk. The detected body 53a has a protruding part (protrusion portion) 53a2 formed to extend in the radial direction from the outer peripheral edge of a main disc-shaped part (disk-shaped portion) 53a1. The protrusion portion 53a2 is a part detected by the detection mechanism 53b, and is a detected portion in the detected body 53a. The detected body 53a is attached to the part of the other end portion of the oscillating arm 52 by a plurality of screw members.

However, the attachment is performed at a position where the center of the disk-shaped portion 53*a*1 matches the axial center of the oscillation shaft 51*c* w % ben viewed in the axial direction of the oscillation shaft 51*c* to which the oscillating arm 52 is attached. Therefore, as the oscillating arm 52 is driven to oscillate, the protrusion portion (detected portion) 53*a*2 of the detected body 53*a* oscillates only by the same oscillation amount of the oscillating arm 52 around the axial center of the oscillation shaft 51*c*. In the illustrated example, the attachment of the detected body 53*a* to the oscillating arm 52 is performed in a phase that the protrusion portion 53*a*2 faces the support 33*a*.

The detection mechanism 53*b* is configured with a pair of detectors 53*b*1 and 53*b*1 and an attachment mechanism for making both the detectors 53*b*1 and 53*b*1 in a state of being attached to the support 33*a* and supported. The attachment mechanism includes an attaching plate 53*b*2 to which both the detectors 53*b*1 and 53*b*1 are attached, and an attaching bracket 53*b*3 for attaching the attaching plate 53*b*2 to the support 33*a*. The pair of detectors 53*b*1 and 53*b*1 are attached to the attaching plate 53*b*2 supported by the support 33*a* by the attaching bracket 53*b*3 with the plurality of screw members, in the placement to face the outer peripheral surface of the disk-shaped portion 53*a*1 of the detected body 53*a* at a position on the support 33*a* side with respect to the detected body 53*a*.

Each detector 53*b*1 detects that the detected body 53*a* (detected portion 53*a*2) has reached the position of the detector 53*b*1, in the detecting section thereof. The placement of both the detectors 53*b*1 and 53*b*1 with respect to the detected body 53*a* is set at a position where the detecting section is positioned in each of the detectors 53*b*1 on the path of the oscillation of the detected portion 53*a*2 in accordance with the oscillation of the oscillating arm 52. Furthermore, the placement of both the detectors 53*b*1 and 53*b*1 is set at a position beyond the boundary position in the oscillating direction of the detected portion 53*a*2, with respect to the position (boundary position) of the detected portion 53*a*2 that corresponds to both oscillation limits in a preset allowable oscillation range (allowable range) for the oscillation of the oscillating arm 52.

The oscillation detection device 53 outputs the detection signal to the control device (not illustrated) in the automated fiber bundle placement apparatus 1 as the detector 53*b*1 in the detection mechanism 53*b* detects the detected body 53*a* (detected portion 53*a*2). Accordingly, for example, in a case where an irregularity occurs at the drive part or the like in the longitudinal oscillation mechanism 50 and the oscillating arm 52 (support member 24) oscillates beyond the above-described allowable range, the oscillation detection device 53 detects the oscillation and the detection signal is output to the control device. Therefore, since the control device grasps that the above-described irregularity has occurred by the detection signal, it is possible to cause the control device to perform appropriate processing (stop and the like) related to the control or the like of the articulated robot 7.

Above, one embodiment (hereinafter, referred to as "the embodiment") of the automated fiber bundle placement apparatus to which the present invention is applied has been described. However, the present invention is not limited to that described in the embodiment, and can also be implemented in another embodiment (modification example) as described below.

(1) Regarding the support mechanism, in the embodiment, the drive mechanism 30 included in the support mechanism 26 includes the longitudinal oscillation mechanism 50 that oscillates the support member 24 in the extending direction of the arm 7*a*, and is configured such that the support mechanism 26 supports the support member 24 via the longitudinal oscillation mechanism 50. However, in the support mechanism of the present invention, the longitudinal oscillation mechanism 50 is not always necessary and can be omitted. In a case where the support mechanism does not include the longitudinal oscillation mechanism in this manner, the support of the support member with respect to the support mechanism may be performed, for example, in a form of attaching an appropriate bracket or the like to the support of the movable member in the drive mechanism and attaching the support member to the bracket or the like.

(2) Regarding the support mechanism, in the embodiment, the rail member 32 (guide rail 32*b*) for guiding the displacement of the support member 24 (the movable member 33 to which the support member 24 is attached) in the support mechanism 26 is formed in an arc shape. Accordingly, the support mechanism 26 displaces the support member 24 not only in the width direction but also in the height direction. However, in the present invention, the support mechanism may be configured such that the support member can be displaced at least in the width direction, and the support member may be configured to be displaced only in the width direction.

For example, similar to the embodiment, in the configuration in which the displacement of the movable member to which the support member 24 is attached is guided by the rail member (guide rail), the rail member is formed in a linear shape instead of the arc shape as in the embodiment. The linear rail member may be provided on the arm 7*a* of the articulated robot 7 while the longitudinal direction thereof matches the width direction. Even in this case, the configuration for displacing the movable member can be realized by using the rack and the pinion as in the embodiment. In the embodiment, in a case where the rail member is formed in an arc shape, the rail member 32 is provided to form an angle of approximately 70° with respect to the extending direction of the arm 7*a* when the arm 7*a* is viewed from the side. However, the angle of the rail member is not limited to such an angle, and can be set to any angle as long as the angle is within a range that does not hinder the guidance of the fiber bundle from the tow guide supported by the support member toward the placement head.

(3) Regarding the drive mechanism for displacing the support member, in a case where the support member is actively displaced in the invention, the support mechanism is configured to include the drive mechanism. In addition, in the embodiment, the drive mechanism 30 is configured such that the movable member 33 to which the support member 24 is attached (which supports the support member 24) is displaced, the driving motor 31 which is a driving source is attached to the movable member 33 (support 33*a*), and the pinion 31*a* attached to the output shaft of the driving motor 31 is engaged with the rack 32*c* provided on the rail member 32 for guiding the displacement of the movable member 33. Accordingly, the drive mechanism 30 is configured such that the driving motor 31 is also displaced together with the movable member 33.

However, in the invention, even when the support member is configured to be actively displaced, the drive mechanism is not limited to the one configured as in the embodiment. For example, in a configuration in which the displacement of the movable member is guided along the arc-shaped rail member as in the embodiment, the driving motor is fixedly placed at a position that is the center of curvature of the rail member (arc). The placement of the driving motor may be performed to be supported by the arm using a bracket or the like. In addition, a lever member attached not to rotatable relative to the output shaft of the driving motor is configured to be connected to the movable member in a form of being rotatable, and the movable member is configured to be connected to the output shaft of the driving motor via the lever member. According to the configuration, the movable member is oscillated and displaced by reversely driving the driving motor. In a case of this configuration, since the movable member is supported by the lever member, it is possible to omit the rail member.

The drive mechanism is not limited to the one configured by using the rack and the pinion as described above, and, for example, can also be a linear motor configured with an electromagnetic coil provided on the movable member and a permanent magnet provided on the rail member. In a case where the support mechanism is configured such that the movable member is displaced only in the width direction, that is, the movable member is displaced linearly, instead of the configuration described above, the drive mechanism can also be ball screw mechanism configured of a combination of a ball screw and a driving motor or a cylinder mechanism such as a cylinder (an air cylinder or a hydraulic cylinder).

(4) In each of the examples described above, the support mechanism includes the drive mechanism having a driving source to actively displace the support member. However, in the invention, the support mechanism is not limited to the one provided with the drive mechanism, and may be configured such that the displacement of the support member is passively performed.

For example, in the support mechanism in which the support member is supported by the movable member and the displacement of the movable member is guided by the rail member, the movable member may be configured to be provided to be freely displaced with respect to the rail member without providing a driving source such as a driving motor. Even with such a configuration, as the placement head is swingably driven, the positions of the part on the placement head side of each of the fiber bundles that reach the placement head from each tow guide are displaced in the swing direction. By doing so, each of the tow guides is in a form of being pulled by the fiber bundle guided by each tow guide, and accordingly, the support member is displaced in accordance with the swing of the placement head.

The invention is not limited to the above-described embodiments, and various modifications can be made without departing from the gist of the invention.

What is claimed is:

1. An automated fiber bundle placement apparatus comprising:
    a supply device configured to set a plurality of bobbins around which fiber bundles are wound, and deliver the fiber bundles from each of the bobbins;
    a placement head for performing placement of each of the fiber bundles supplied from the supply device on a placement die; and
    an articulated robot which has an arm to which the placement head is attached and moves the placement head for the placement, in which the placement head is attached to the articulated robot via a rotation mechanism, wherein
    the placement head is attached to a rotation section that is rotationally driven,
    the articulated robot includes a guide mechanism that guides the fiber bundle from the supply device toward the placement head, and
    the guide mechanism includes
        a plurality of tow guides provided in a form of being corresponded to each of the fiber bundles, each of the tow guides being configured with a cylindrical shape and being configured to guide corresponding fiber bundles in a form of being turned;
        a support member that supports the tow guide; and
        a support mechanism attached to the arm and also attached to the support member so that the support member is in a state of being supported by the arm, the support member being displaceable in a width direction orthogonal to an extending direction of the arm in a plane.

2. The automated fiber bundle placement apparatus according to claim 1, wherein
    the support mechanism includes a drive mechanism that displaces the support member by a driving motor which is driven in accordance with the rotation of the placement head by the rotation mechanism.

3. The automated fiber bundle placement apparatus according to claim 2, wherein
    the support mechanism is configured such that the support member is also displaceable in a height direction orthogonal to the width direction when viewed in the extending direction of the arm.

4. The automated fiber bundle placement apparatus according to claim 2, wherein
    the drive mechanism includes a rail-shaped rail member attached to the arm and provided to extend in a displacement direction of the support member, a movable member which is guided by the rail member and is displaced on the rail member, and to which the support member is attached, and a driving unit for displacing the movable member on the rail member.

5. The automated fiber bundle placement apparatus according to claim 1, wherein
    the support mechanism is configured such that the support member is also displaceable in a height direction orthogonal to the width direction when viewed in the extending direction of the arm.

* * * * *